US006444711B2

(12) United States Patent
Varadaraj et al.

(10) Patent No.: US 6,444,711 B2
(45) Date of Patent: Sep. 3, 2002

(54) AQUEOUS, PUMPABLE FLUIDS FROM SOLID CARBONACEOUS MATERIALS

(75) Inventors: Ramesh Varadaraj, Flemington; Cornelius Hendrick Brons, Washington; David William Savage, Lebanon, all of NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 0 days.

(21) Appl. No.: 09/755,273

(22) Filed: Jan. 5, 2001

Related U.S. Application Data

(60) Division of application No. 09/350,861, filed on Jul. 9, 1999, now Pat. No. 6,211,252, which is a continuation-in-part of application No. 09/265,174, filed on Mar. 9, 1999, now abandoned, which is a continuation-in-part of application No. 08/889,744, filed on Jul. 8, 1997, now abandoned.

(51) Int. Cl.[7] .............................. B01F 3/12; C10L 1/10
(52) U.S. Cl. ............................ 516/38; 516/77; 137/13; 44/280
(58) Field of Search ................... 516/38, 77; 137/13; 44/280; 524/60

(56) References Cited

U.S. PATENT DOCUMENTS

| 2,481,322 A | 9/1949 | McCoy ........................ 516/46 |
| 2,494,708 A | 1/1950 | Jesseph ........................ 516/41 |
| 2,670,332 A | 2/1954 | McCoy et al. ................ 516/48 |
| 4,293,459 A | 10/1981 | Detroit ........................ 106/277 |
| 4,370,429 A | 1/1983 | Clarke et al. ................ 524/60 |
| 4,375,358 A | 3/1983 | Swartz et al. ................ 44/280 |
| 4,529,408 A | 7/1985 | Yan ............................. 44/280 |
| 4,604,188 A | 8/1986 | Yan et al. .................... 208/106 |
| 4,610,695 A | 9/1986 | Crespin et al. .............. 516/38 |
| 4,692,169 A | 9/1987 | Howland et al. ............ 44/280 |
| 4,725,287 A | 2/1988 | Gregoli et al. ............... 44/301 |
| 4,749,381 A | 6/1988 | Yaghmaie et al. ........... 44/280 |
| 4,842,616 A | 6/1989 | Verhille ....................... 44/281 |
| 4,872,885 A | 10/1989 | Tsubakimoto et al. ....... 516/41 |
| 4,938,983 A | 7/1990 | Peignier et al. .............. 426/573 |
| 4,949,743 A | 8/1990 | Broom ......................... 137/13 |
| 5,024,676 A | 6/1991 | Moriyama et al. ........... 44/301 |
| 5,478,365 A | 12/1995 | Nikanjam et al. ........... 44/280 |
| 5,690,704 A | 11/1997 | Hayashi et al. .............. 44/280 |
| 5,843,302 A | 12/1998 | Hood ........................... 208/309 |
| 6,027,634 A | 2/2000 | Shirodkar et al. ........... 516/38 |
| 6,117,305 A | 9/2000 | Bando et al. ................ 44/280 |
| 6,211,252 B1 * | 4/2001 | Varadaraj et al. ........... 516/38 |

OTHER PUBLICATIONS

Weast, Robert C.; Astle, Melvin, J., "*CRC Handbook of Chemistry and Physics*", 63rd Edition, 1982–1983, Month Unknown.

Sax, N. Irving; Lewis, Richard, J., "*Hawley's Condensed Chemical Dictionary*", 11th Edition, Van Nostrand Reinhold Company, New York, Copyright 1987 (Oct. 1989).

* cited by examiner

*Primary Examiner*—Daniel S. Metzmaier
(74) *Attorney, Agent, or Firm*—Linda M. Scuorzo; Ramesh Varadaraj

(57) ABSTRACT

The invention is a method for forming a solid carbonaceous material into a pumpable fluid by combining the solid with an aqueous treatment solution and then subjecting the mixture to shearing forces. The solid carbonaceous material can be deasphalter unit rock ("DAU rock"), coke, and mixtures of DAU rock and coke. Aqueous treatment solutions contain a water soluble polymer.

2 Claims, 3 Drawing Sheets

AQUEOUS, PUMPABLE FLUIDS FROM SOLID CARBONACEOUS MATERIALS

This is a Divisional, of the application Ser. No. 09/350,861, filed Jul. 9, 1999, now U.S. Pat. No. 6,211,352.

This application is a Continuation-In-Part under 37 CFR 1.53(b) of U.S. Ser. No. 09/265,174 filed Mar. 9, 1999, which is a Continuation-In-Part under 37 CFR 1.53(b) of U.S. Ser. No. 889,744 filed Jul. 8, 1997.

FIELD OF THE INVENTION

The invention relates generally to forming pumpable compositions from solid materials. More specifically, the invention relates to a fuel in the form of a pumpable fluid formed from solid carbonaceous materials.

BACKGROUND OF THE INVENTION

Solid carbonaceous materials are often formed as by-products of petroleum refining and separation. De-Asphalting Unit (DAU) rock and coke formed in coking units are examples of such materials. These materials are useful as fuels for power generation and also in reactions such as hydrocarbon partial oxidation.

Solvent de-asphalting is one method for upgrading resids produced in vacuum and atmospheric pipestills. One by-product of solvent de-asphalting is deasphalting unit ("DAU") rock. DAU rock is a solid carbonaceous material that has a high concentration of Conradson carbon ("Concarbon") and metals. The presence of Concarbon and metals diminishes DAU rock's usefulness as a feed for further refining and leads to very high disposal costs. However, this material is useful as a feed for power generation and for the production of CO and hydrogen, a mixture frequently referred to as syngas, from the partial oxidation of hydrocarbons such as methane.

Cokers are also used for refining resids produced in atmospheric and vacuum pipestills. Petroleum/refinery coke ("coke") is the solid carbonaceous material formed in the coker. Coke generally forms in one of three solid morphologies. Most petroleum coke is formed as "sponge coke", a hard porous irregularly shaped material ranging in size from about 20 inches to a fine dust. Some coke is formed in the shape of very fine needle shaped particles called needle coke. The least common form of coke is "shot" coke, named from the clusters of shot-sized pellets in which it is most often found.

Petroleum coke does not have sufficient strength to be useful in the production of pig iron or as foundry coke. Additionally, the high concentration of metals in petroleum source results in high disposal costs. However, like DAU rock, this material is useful as a fuel for power generation and syngas production.

One problem associated with the use of coke or DAU rock as a fuel results from the logistical difficulties and high transportation costs incurred in moving the fuel from a refinery to a power plant. Certain processes described in the art require an emulsion of two liquids (e.g., U.S. Pat. Nos. 4,293,459 and 5,478,365). In such cases the presence of hot (liquefied) heavy hydrocarbon is required with a strong emulsifying agent There the hydrocarbon is not present as solid particles but must itself be liquefied.

However, if the DAU rock or coke could be formed into an aqueous, pumpable fluid, the fuel could be transported easily and at low cost through conventional pipelines. One should also note that the presence of water in the pumpable fluid along with the feed is advantageous in power generation, where water is frequently required for processes such as steam reforming.

There is therefore is a need for a method of forming coke or DAU rock into an aqueous, pumpable fluid.

Certain aqueous slurries of coal and coke are known. These slurries are formed by combining coal or coke with an aqueous fluid containing polymers such as gum tragacanth, gum arabic, guar gum, xanthan gum, starch, CM-cellulose, unhydrolyzed gelatin, carageenan, and hydroxymethyl cellulose. Treatment solutions known in the art may also contain anionic or non-ionic surfactants such lignosulfonate and polyethylene oxide surfactants. Such treatment solutions have surfactant and polymer concentration in the range of about 0.5 wt % (about 5,000 ppm) to about 5 wt %.

One object of the present invention is the production of an aqueous treatment solution having reduced polymer concentration alone that is capable of forming DAU rock, coke, and mixtures thereof into a pumpable fluid.

SUMMARY OF THE INVENTION

One embodiment is a method for forming an aqueous, pumpable admixture, by (a) admixing carbonaceous solid particles less than 177 microns in size wherein the solid carbonaceous particles are selected from the group consisting of coke, DAU rock, and mixtures thereof, and an aqueous treatment solution wherein the amount of treatment solution ranges from about 20 wt % to about 60 wt % of the total weight of carbonaceous solid and treatment solution and wherein the aqueous treatment solution comprises a water-soluble polymer capable of viscosifying water, the polymer being present in an amount ranging from about 10 to about 500 ppm; and then (b) subjecting the admixture to shearing forces for a time sufficient to reduce the admixture's viscosity to below about 20,000 cPs at ambient temperature (25° C.).

Another embodiment is an aqueous, pumpable composition having a viscosity below about 20,000 cPs comprising a carbonaceous solid selected from the group consisting of coke, DAU rock, and mixtures thereof and an aqueous treatment solution comprising a water soluble polymer capable of viscosifying water, the polymer being present in an amount ranging from about 10 to about 500 ppm, wherein the concentration of the carbonaceous solid in the treatment solution ranges from about 40 wt % to about 70 wt % based on the weight of the carbonaceous material and water.

The invention may comprise, consist or consist essentially of the elements or steps recited herein and may be practiced in the absence of a limitation not disclosed as required.

DETAILED DESCRIPTION OF THE PREFERRED EMBODIMENTS

Figure 1:
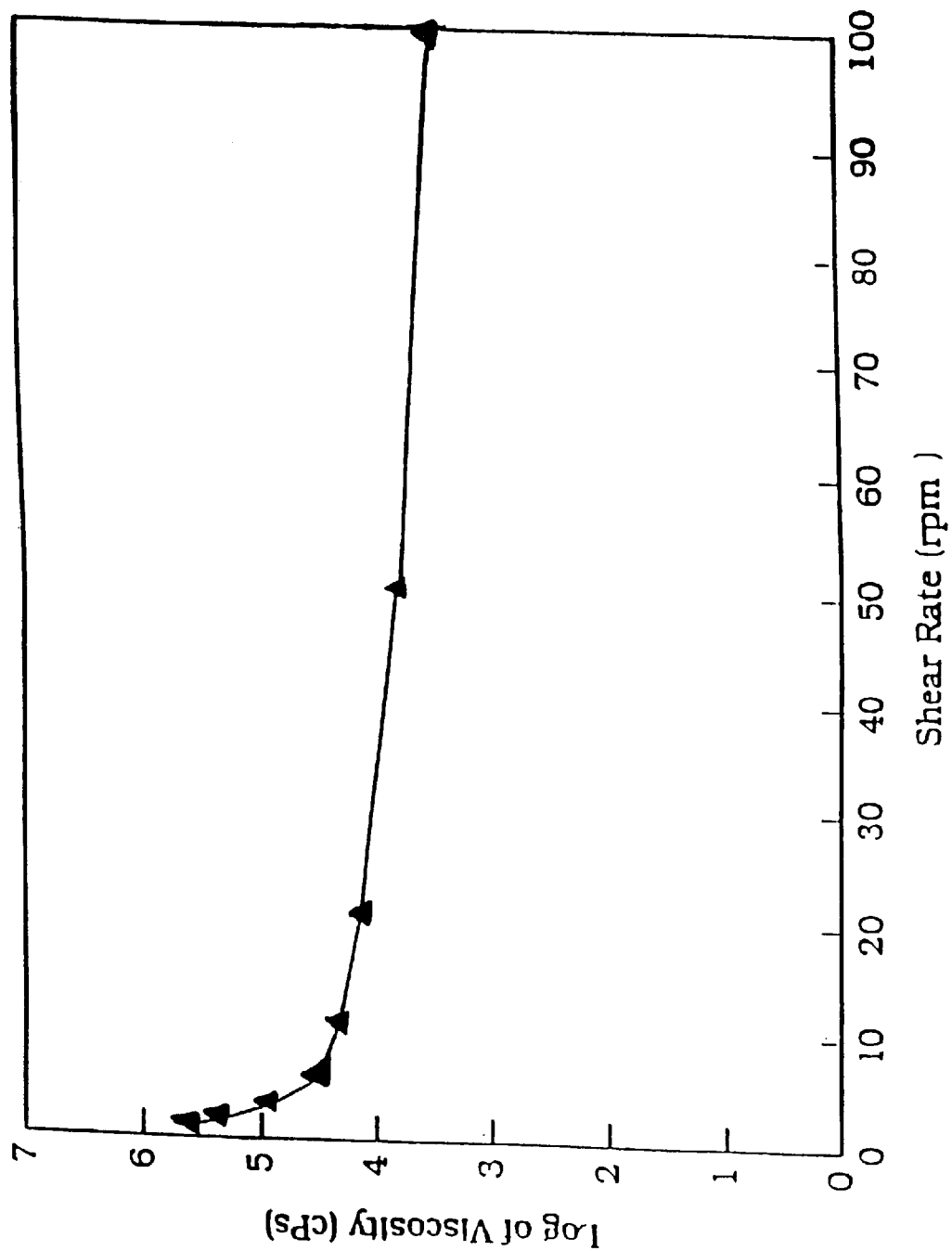
FIG. 1 shows the behavior of an admixture of DAU rock and treatment solution containing xanthan gum polymer as a function of shear rate.

A preferred embodiment of the invention is directed towards forming aqueous, pumpable fluids from solid carbonaceous materials as described herein. DAU rock, coke, and mixtures thereof are examples of solid carbonaceous materials that are useful in the practice of the present embodiment. In the practice of the invention, solid carbonaceous material having a particle size ranging from about $10\mu$ to about $177\mu$ is combined with an aqueous treatment solution containing a small amount of polymer. Asphalts are not included within the term DAU rock. The DAU rock used is formed by contacting crude oil residuum obtained from atmospheric or vacuum pipestills with a suitable amount of alkane deasphalting solvent. These solvents are known in the art and include propane, butane, pentane and hexane as are treatment conditions are known to those skilled in the art. Typical conditions include a ratio of feed to deasphalting solvent from 1:4 to 1:14. However, solvent ratios, temperatures and pressures for deasphalting are known to those skilled in the art. The treatment results in a deasphalted oil ("DAO") and a solvent insoluble material termed DAU Rock.

In cases where the solid carbonaceous material is in the form of particles exceeding $177\mu$ in size, some method of separating the oversized particles such as sieving must be employed to ensure that particles larger than $177\mu$ are excluded. Alternatively, some method of comminuting, such as wet grinding, dry grinding, or ball milling the solid carbonaceous material may be used to reduce the particle size to below $177\mu$. Combinations of comminuting and sieving may also be used in connection with obtaining particles in the proper size range. In cases where particle size must be reduced, ball milling is preferable to dry grinding. Ball milling is preferred because it can be conducted in the presence of the treatment solution and because ball milling results in particles that are smaller and more uniformly sized. Consequently, ball milling will generally not require a separate sieving step. In any event the resulting particles will be essentially non-spherical i.e., irregularly shaped.

Once the proper particle size is obtained, the solid carbonaceous material is combined with a treatment solution. Importantly, the treatment solution is not merely added to the solid carbonaceous material. The treatment solution and solid carbonaceous material are mixed until the particles of solid carbonaceous material have been wetted by the treatment solution. The treatment solution is an aqueous solution wherein the amount of water present is sufficient to provide a solid to water ratio ranging from about 40:60 to about 80:20. Preferably, the solid to water ratio will range from about 60:40 to about 70:30. The solid carbonaceous material should remain as solid particles in the aqueous treatment fluid. This is distinguished from those described in the art wherein hydrocarbon is at a temperature greater than its softening point (i.e., is a liquid) and is mixed with water in the presence of surfactant or emulsifying agent at high temperatures and pressures. Thus, in the prior art the treatment solution is a liquid–liquid system during preparation whereas the present embodiment is practiced as a solid-liquid system during the formation of the aqueous pumpable fluid and in the absence of a surfactant The nature and properties of complex hydrocarbon-water fluids originating from liquid–liquid preparation are significantly different form those originating from solid-liquid preparations.

The treatment solution contains water and a water-soluble polymer that is capable of viscosifying water. A surfactant is generally lower in molecular weight, will not viscosity water at the 10 to 500 ppm concentration range and contain distinct hydrophillic and hydrophobic functional groups per molecule. The polymer may be a functionalized polymer. Polymers that are useful in the practice of the invention include polyacrylamide polymer and xanthan gum. The polymer should be present in an amount ranging from about 10 to about 500 ppm. The preferred polymer is xanthan gum. The addition of this viscosifying or thickening agent alters the viscosity of the aqueous liquid and alters the wettability of solid carbonaceous material. As a result, the process can be practiced with a treatment solution comprising water and polymer.

Surprisingly, it was discovered that among the polymers known to form aqueous slurries with carbonaceous materials, xanthan gum was capable of forming pumpable fluids at very low concentration, on the order of about 10 to 100 ppm, with the mixture of solid carbonaceous material and treatment solution subjected to shearing at about 100 rpm. This is unexpected because there is no surfactant or emulsifier required Additionally, lower concentrations of polymer being active without the surfactant or emulsifier indicates the stabilizing properties for the aqueous polymer solution at low concentrations is unexpected.

The mixture's viscosity decreases when it is subjected to shearing forces at ambient temperature (20–26° C.) and atmospheric pressure. The viscosity decreases from that of a viscous fluid (approximately 20,000 cPs and above) to that of an aqueous pumpable fluid (below approximately 20,000 cPs) at a shear rate of about 100 rpm. The mixture is mixed for sufficient time and at a optimum rate so that the viscosity of the mixture is decreased to a value in the range that is pumpable. For example, after the initial shearing at 100 rpm, the mixture is equilibrated at rest for 48 hours. After 48 hours the viscosity behavior is repeatable indicating stability of the slurry.

In cases in which the solid is coke, the same general behavior seen for DAU rock is observed.

Mixtures of treatment solution and-solid may be readily transported via pipeline to power generating equipment after shearing decreases the mixture's viscosity into the range of a pumpable fluid.

EXAMPLES

Example 1

A DAU rock specimen was subjected to dry grinding and sieving in order to produce a DAU rock powder with a particle size ranging upwards to about $177\mu$. Admixtures of DAU rock and three different treatment solutions were prepared and subjected to shearing forces while monitoring admixture viscosity. The results of those measurements are shown in FIG. 1. Xanthan gum was used as the polymer. The points represented by triangles show the viscosity of a treatment solution containing 60 wt % DAU rock, 40 wt % water, 12.5 ppm polymer.

FIG. 1 shows a decrease in viscosity as shear rate is increased. Shear of 100 rpms produced a pumpable solution.

The sample was then allowed to equilibrate for two days at ambient temperature (25° C.) and pressure, and the viscosity measurements were repeated at the end of that interval. No significant changes in viscosity was observed indicating the slurry was stable over a 48 hour time period.

Example 2

Figure 2:
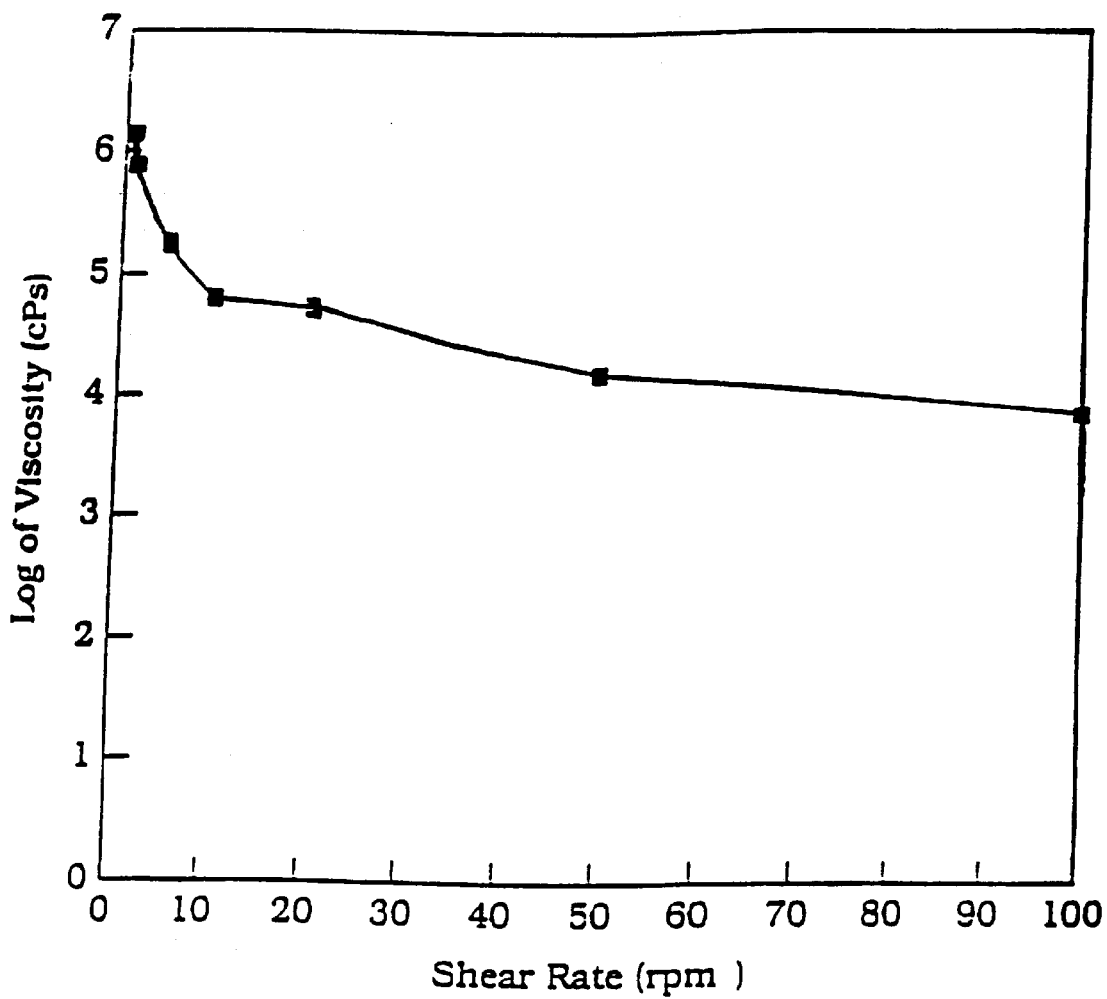
FIG. 2 shows the behavior of an admixture of DAU rock and a treatment solution treatment solution formed from 100 ppm polyacrylamide.

For comparison purposes, a treatment solution using polyacrylamide in place of xanthan gum was tested. The polyacrylamide had an average molecular weight of $5 \times 10^6$ and was obtained from Polysciences Inc., Warrington, Pa. FIG. 2 shows the variation of shear rate with viscosity for this rock slurry. While it is possible to attain viscosity levels similar to those shown in FIG. 1, polyacrylamide concentration must be in the range of about 100 ppm.

Example 3

Figure 3:
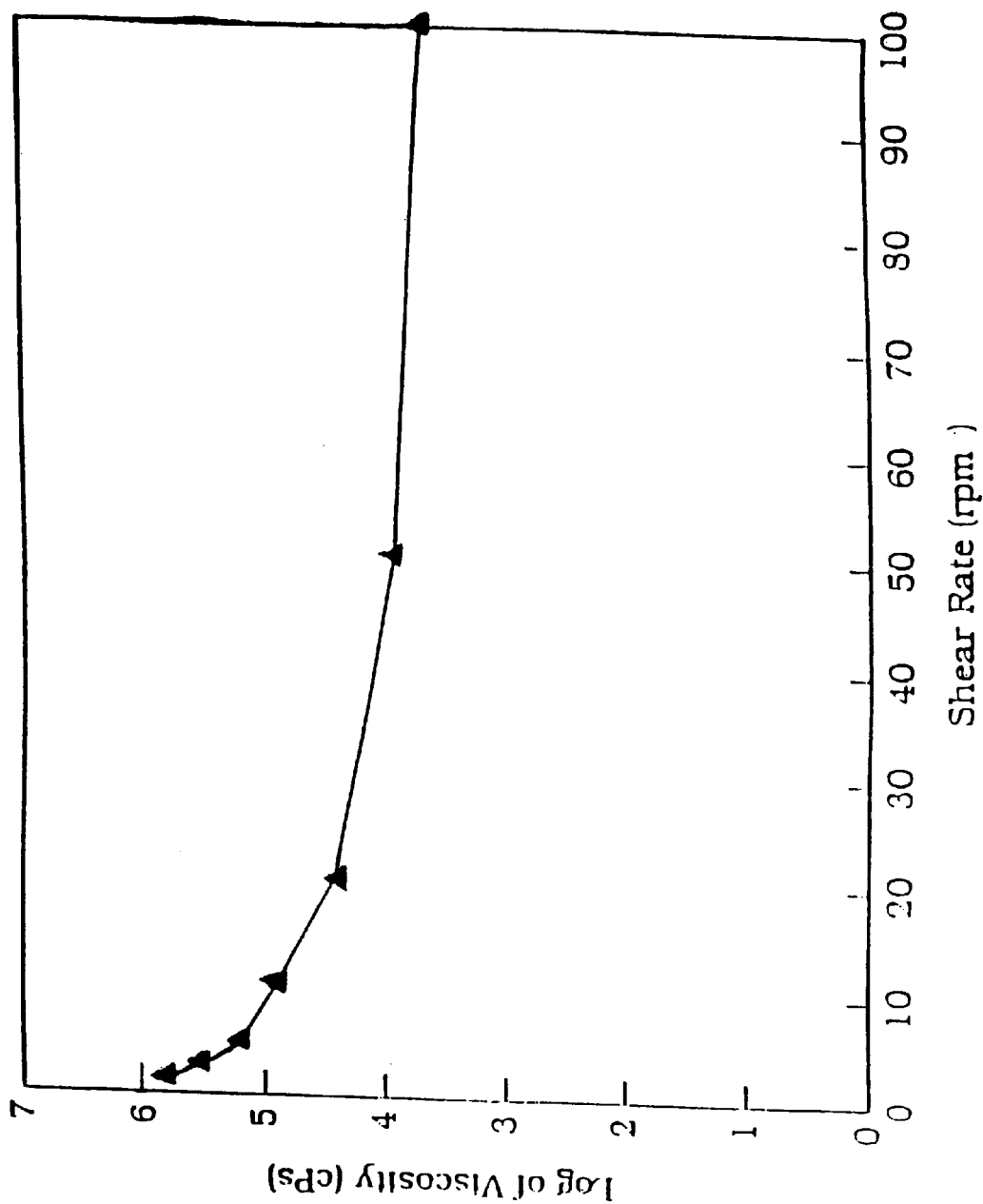
FIG. 3 shows the behavior of an admixture of coke and treatment solution containing xanthan gum polymer as a function of shear rate.

A Flexicoke specimen coke was used "as received" from a refinery Flexicoker unit Sieving the coke resulted in the removal of coke particles larger than 177 microns. Admixtures of coke and two different treatment solutions were prepared and subjected to shearing forces while monitoring admixture viscosity. The results of those measurements are shown in FIG. 3. The points represented by triangles show the viscosity of a treatment solution containing 60 wt % coke, 40 wt % water, 12.5 ppm xanthan polymer.

A decrease in viscosity with shear rate is observed similar to the DAU rock slurry.

The sample was then allowed to equilibrate for two days at ambient temperature and pressure, and the viscosity measurements were repeated at the end of that interval. No significant change in viscosity was observed indicating the slurry was stable over a 48 hour period.

What is claimed is:

1. An aqueous, pumpable composition having a viscosity at ambient temperature below about 20,000 cPs consisting of a carbonaceous solid consisting of particles less than 177 microns in size wherein the carbonaceous solid is selected from the group consisting of coke, DUA rock, and mixtures of DUA rock and coke, an aqueous treatment solution consisting of water and a water soluble polymer capable of viscosifying water, the polymer being present in an amount ranging from 10 to 500 ppm, wherein the concentration of the carbonaceous solid in the treatment solution ranges from 40 wt. % to 70 wt. % based on the weight of the carbonaceous material and water.

2. The composition of claim 1 wherein the polymer is xanthan gum.

* * * * *